(12) United States Patent
Cui et al.

(10) Patent No.: US 10,853,116 B2
(45) Date of Patent: Dec. 1, 2020

(54) MACHINE LEARNING PREDICTION OF VIRTUAL COMPUTING INSTANCE TRANSFER PERFORMANCE

(71) Applicant: VMware, Inc., Palo Alto, CA (US)

(72) Inventors: Liang Cui, Beijing (CN); Siddharth Ekbote, San Jose, CA (US); Weiqing Wu, Cupertino, CA (US); Todd Sabin, Morganville, NJ (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 16/040,272

(22) Filed: Jul. 19, 2018

(65) Prior Publication Data

US 2020/0026538 A1    Jan. 23, 2020

(51) Int. Cl.
| | |
|---|---|
| G06F 9/455 | (2018.01) |
| G06F 11/34 | (2006.01) |
| G06N 3/02 | (2006.01) |
| G06N 7/00 | (2006.01) |
| G06F 11/20 | (2006.01) |
| G06K 9/62 | (2006.01) |

(52) U.S. Cl.
CPC ........ *G06F 9/45558* (2013.01); *G06F 11/203* (2013.01); *G06F 11/3447* (2013.01); *G06F 11/3452* (2013.01); *G06K 9/6269* (2013.01); *G06N 3/02* (2013.01); *G06N 7/005* (2013.01); *G06F 2009/4557* (2013.01); *G06F 2009/45591* (2013.01)

(58) Field of Classification Search
CPC .. G06F 2009/4557; G06F 9/455; G06N 20/00
See application file for complete search history.

(56) References Cited

U.S. PATENT DOCUMENTS

| | | | |
|---|---|---|---|
| 9,195,484 B1 * | 11/2015 | Ward, Jr. ................ | G06F 9/455 |
| 9,672,054 B1 * | 6/2017 | Gupta ................. | G06F 9/45558 |
| 9,727,366 B2 * | 8/2017 | Dow ................... | G06F 9/45558 |

(Continued)

OTHER PUBLICATIONS

Sherif Akoush; Predicting the Performance of Virtual Machine Migration 2010; (Year: 2010).*

(Continued)

*Primary Examiner* — Dong U Kim
(74) *Attorney, Agent, or Firm* — Patterson + Sheridan, LLP

(57) ABSTRACT

The disclosure provides an approach for preventing the failure of virtual computing instance transfers across data centers. In one embodiment, a flow control module collects performance information primarily from components in a local site, as opposed to components in a remote site, during the transfer of a virtual machine (VM) from the local site to the remote site. The performance information that is collected may include various performance metrics, each of which is considered a feature. The flow control module performs feature preparation by normalizing feature data and imputing missing feature data, if any. The flow control module then inputs the prepared feature data into machine learning model(s) which have been trained to predict whether a VM transfer will succeed or fail, given the input feature data. If the prediction is that the VM transfer will fail, then remediation actions may be taken, such as slowing down the VM transfer.

19 Claims, 6 Drawing Sheets

(56) References Cited

U.S. PATENT DOCUMENTS

| | | | | |
|---|---|---|---|---|
| 2013/0086272 | A1* | 4/2013 | Chen | G06F 9/4856 709/226 |
| 2013/0212578 | A1* | 8/2013 | Garg | H04L 43/0882 718/1 |
| 2014/0359607 | A1* | 12/2014 | Tsirkin | G06F 9/48 718/1 |
| 2015/0331715 | A1* | 11/2015 | Sathyanarayana | H04L 67/10 709/226 |
| 2016/0337480 | A1* | 11/2016 | Anerousis | G06F 9/45558 |
| 2019/0095233 | A1* | 3/2019 | Iikura | G06F 11/3447 |

OTHER PUBLICATIONS

Alex J. Smola et al., A Tutorial on Support Vector Regression, Statistics and Computing Archive, vol. 14, Issue 3, Aug. 2004, pp. 199-222.

Christopher M. Bishop, Pattern Recognition and Machine Learning, Chapter 4.3.4, 2 pages.

D. E. Rumelhart et al., Learning representations by back-propagating errors, Letters of Nature, vol. 323, Oct. 9, 1986, pp. 533-536.

Harry Zhang, The Optimality of Naive Bayes, Proc. FLAIRS, 2004, 6 pages.

* cited by examiner

MACHINE LEARNING PREDICTION OF VIRTUAL COMPUTING INSTANCE TRANSFER PERFORMANCE

BACKGROUND

Computer virtualization is a technique that involves encapsulating a computing machine platform into a virtual machine (VM) that is executed under the control of virtualization software running on a hardware computing platform (also referred to herein as a "host computer" or "host"). A group of hardware computing platforms may be organized as a cluster to provide resources for VMs. In a data center, it is common to see hundreds, even thousands, of VMs running on multiple clusters of hosts.

VMs running in hosts can be actively managed to improve their overall performance. One example of active management is the transfer of VMs from one host to another. As used herein, "transfer" of a VM may include copying the VM to a new location and deleting the original VM, or replicating a VM to a new location, resulting in an additional copy of the VM. The transfer of a VM may be "live," meaning a running VM is moved, or not live. VMs may undergo transfer from busy hosts to underutilized hosts to achieve load balancing across hosts. Transfer of VMs may also be carried out to enable host maintenance. Examples of tools that may be used to perform a VM transfer include vMotion® and vSphere® Replication™, which are commercially available from VMware, Inc. of Palo Alto, Calif.

Transfers of VMs across data centers in particular may be carried out across various components, such as (physical and/or virtual) storage devices, hosts, service nodes, network devices, network boosters (e.g., wide area network (WAN) optimizers), intermediate routers, and so on. Any of these components may be underperforming and impact packet transmission and the VM transfer flow, which can in turn cause the VM transfer to fail, wasting resources and leading to user frustration. However, it is difficult to collect information from all such components, and particularly from components located in a remote site, to use as feedback for controlling VM transfer flow and preventing failure of a VM transfer. In addition, in-flight data is essentially unpredictable, as the size of the in-flight data depends on many factors such as bandwidth delay, queue depths of intermediate routers, and data compression ratio that may change dynamically based on data patterns during the VM transfer. As a result, it is difficult to predict the bottleneck bandwidth, as the in-flight data size may vary, and it is also difficult to extrapolate past predictions into the future for controlling VM transfer flows and preventing the failure of VM transfers.

SUMMARY

One or more embodiments provide a method of transferring a virtual computing instance from a first data center to a second data center. The method generally includes receiving performance information associated with a transfer of the virtual computing instance from the first data center to the second data center over a data transfer path. The method further includes predicting, using at least a machine learning model and the received performance information, whether the transfer of the virtual computing instance will succeed. In addition, the method includes, responsive to predicting that the transfer of the virtual computing instance will not succeed, reducing a rate at which the virtual computing instance is transferred.

Further embodiments include a non-transitory computer-readable storage medium storing instructions that, when executed by a computing system cause the computing system to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein provide techniques for preventing the failure of virtual computing instance transfers across data centers. Although virtual machines (VMs) are used herein as a reference example of virtual computing instances, it should be understood that techniques disclosed herein are also applicable to other types of virtual computing instances, such as containers. In one embodiment, a VM transfer flow control module collects performance information primarily from components in a local site, as opposed to components in a remote site, during the transfer of a VM from the local site to the remote site. The collected performance information may include various performance metrics such as disk input/output (I/O) read rate collected from a hypervisor running in a host computer; data insertion rate collected from a mobility agent; compression ratio and throughput collected from a wide area network (WAN) optimizer; and/or network latency, throughput, and packet loss collected from a gateway, each of which may be considered a feature as discussed in greater detail. The flow control module then performs feature preparation by, e.g., normalizing the collected feature data and imputing missing feature data, if any. The flow control module further inputs the prepared features into one or more machine learning models that have been trained to predict whether the transfer of a VM will succeed or fail, given input feature data. If the prediction is that the VM transfer will fail, then remediation action(s) may be taken, such as slowing down the VM transfer.

Figure 1:
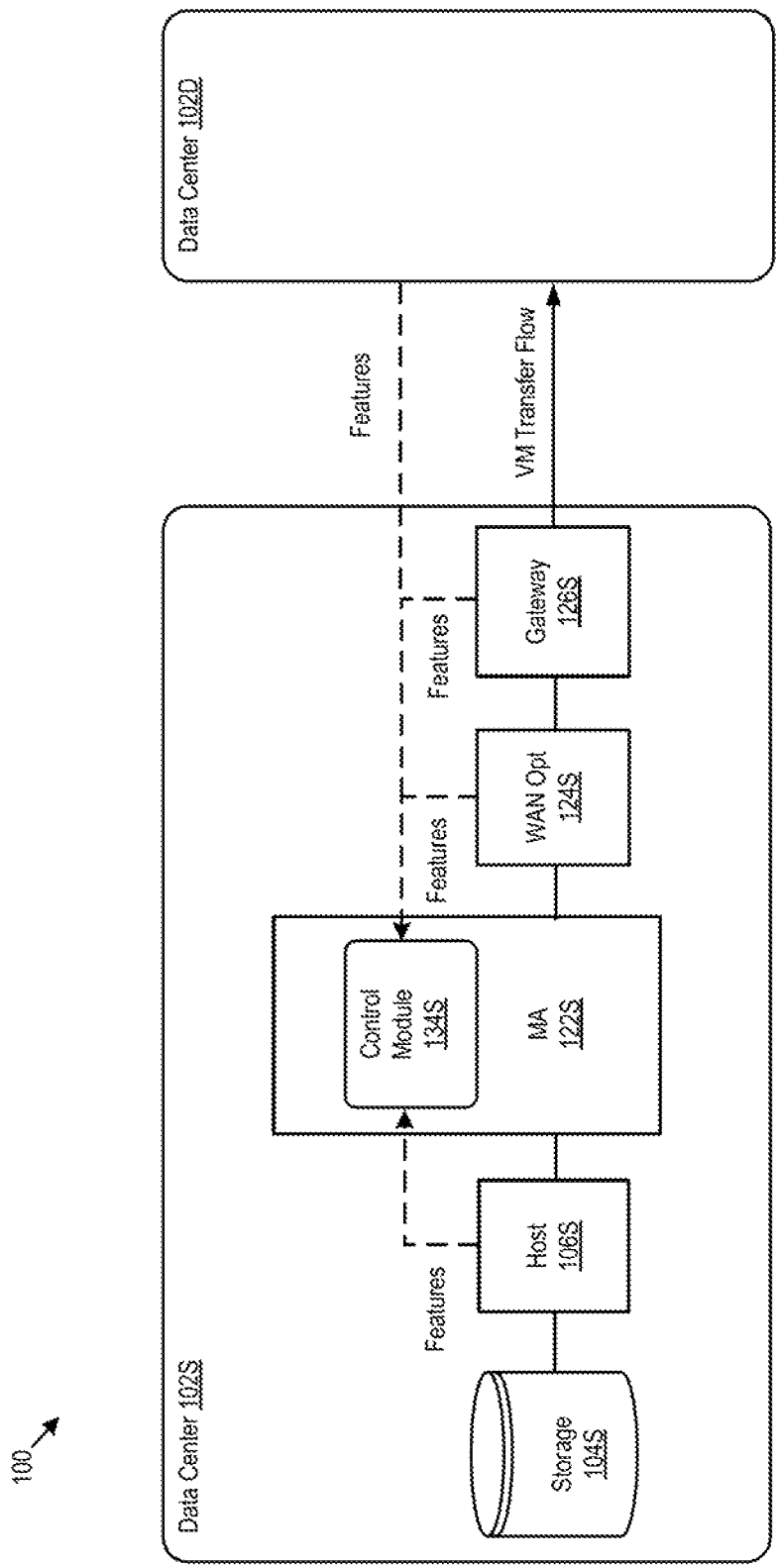
FIG. 1 illustrates an approach for smoothing virtual machine transfer performance using the predictions of machine learning model(s), according to an embodiment.

FIG. 1 illustrates an approach for smoothing virtual machine transfer performance using the predictions of machine learning model(s), according to an embodiment. As shown, a cross-site computing system 100 includes a source 102S and a destination data center 102D. A VM 120 is transferred from source data center 102S to destination data center 102D over a network 150. During the transfer of VM 120, a VM transfer flow control module 134 in a source mobility agent 122S collects performance information relating to the transfer, constructs a feature vector from the collected information, and inputs the feature vector into machine learning model(s) that each outputs a prediction of whether the transfer will succeed or fail. Although shown as being a module within source mobility agent 122S, control module 134 may also be separate from source mobility agent 122S, such as a separate module running in the same VM and in communication with source mobility agent 122S. As used herein, failure of a VM transfer may include, e.g., the VM transfer timing out when a destination host does not receive transferred data for more than a predefined period of time (e.g., 120 seconds). The machine learning model(s) may be trained using supervising learning techniques to optimize relationships between various factors and, in one embodiment, the trained machine learning model(s) may each be a two-class classifier that takes feature vectors as inputs and outputs labels indicating success or failure of corresponding VM transfers, such as the labels $l_1=0$ and $l_2=1$, where:

$$\begin{cases} VM \text{ transfer successful,} & \text{if } l = 0 \\ VM \text{ transfer failure,} & \text{if } l = 1 \end{cases}$$

When failure of the VM transfer is predicted, remediation action(s) may be taken, such as notifying a source VM transfer engine in a hypervisor running in source host computer 106S to slow down (also sometimes referred to as "back off") a data transfer rate of the VM transfer, thereby preventing the transfer from failing, as discussed in greater detail below. In another embodiment, the machine learning model(s) may be trained to predict a probability of success, also referred to herein as the predicted success rate, as opposed to simply success or failure.

Illustratively, control module 134 collects performance information associated with the VM transfer from a gateway 126S, a wide area network (WAN) optimizer 124, source mobility agent 122S, and a hypervisor running in source host computer 106S from which VM 120 is being transferred, each of which is discussed in greater detail below. Although described separately herein, it should be understood that source mobility agent 122S, WAN optimizer 124S, and/or source gateway 126S may run in the same virtual or physical machine, or in distinct virtual or physical machines. As described, the collection of performance information primarily from components in the local site (source data center 102S in this case), as opposed to components in a remote site (destination data center 102D in this case), avoids the difficulty of collecting information from components in the remote site. In some embodiments, performance information may also be collected from sources other than those shown in FIG. 1, such as middleboxes other than WAN optimizer 124 that transform, inspect, filter, or otherwise manipulate network traffic. In addition, some performance information may be collected from components in destination data center 102D, such as a hypervisor running in a destination host computer, a gateway 126S in destination data center 102D, and so on. For example, a data delivery rate may be collected from the hypervisor running in the destination host computer and sent back to control 134 in one embodiment.

Figure 2:
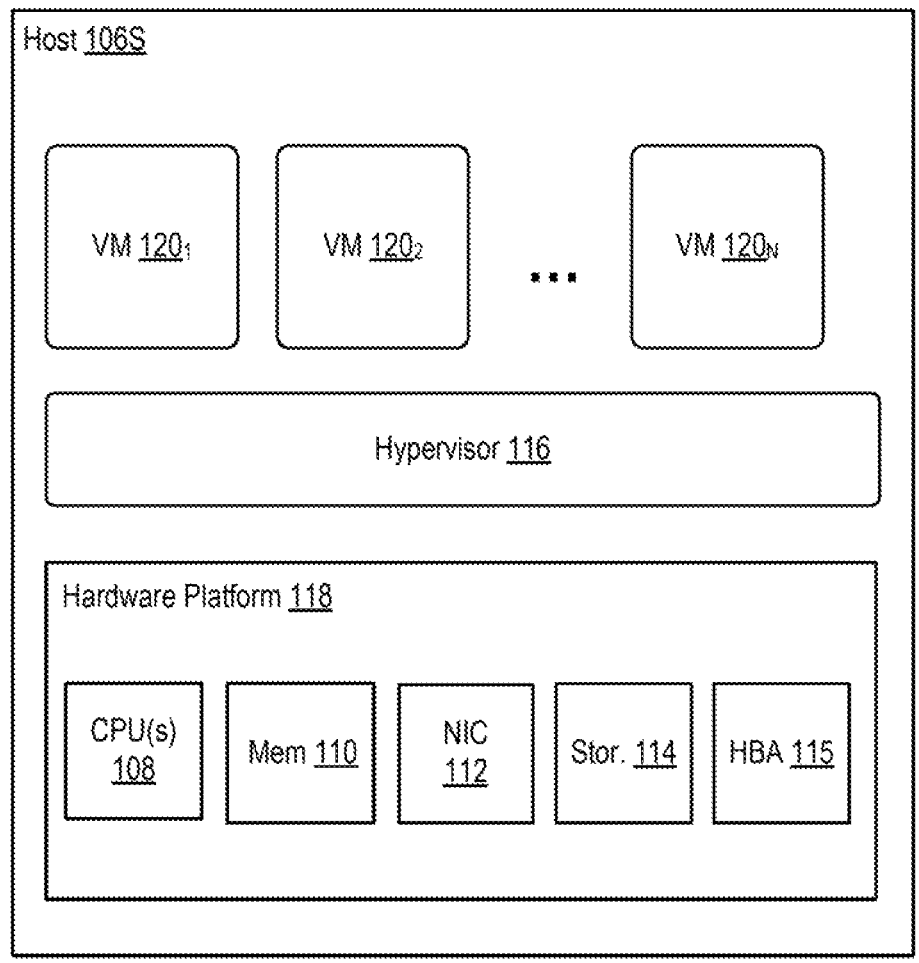
FIG. 2 illustrates a host computer system, according to an embodiment.

Host computer system 106S may be constructed on a server grade hardware platform 118, such as an x86 architecture platform, shown in FIG. 2. As shown in FIG. 2, a hardware platform 118 of host 106S includes one or more processors (shown as CPU(s)) 108, system memory 110, a network interface 112, storage system 114, a host bus adapter (HBA) 115, and I/O devices such as, for example, a mouse and keyboard (not shown). Processor(s) 108 are configured to execute instructions, for example, executable instructions that perform one or more operations described herein and may be stored in memory 110 and in local storage 114. Memory 110 is a device allowing information, such as executable instructions, cryptographic keys, virtual disks, configurations, and other data, to be stored and retrieved. Memory 110 may be a byte-addressable, random access memory, and memory 110 may include, for example, one or more random access memory (RAM) modules. Network interface 112 enables host 106 to communicate with another device via a communication medium, such as a network within data center 102S. Network interface 112 may include one or more network adapters, also sometimes referred to as Network Interface Cards (NICs). Storage system 114 represents one or more persistent storage devices (e.g., one or more hard disks, flash memory modules, solid state disks, and optical disks) in host computer 106S. Illustratively, host 106S is configured to provide a virtualization layer 116, also referred to herein as a "hypervisor," that abstracts processor, memory, storage, and networking resources of hardware platform 118 into multiple virtual machines $120_1$ to $120_n$ (collectively referred to as VMs 120) that run concurrently on the same hosts. VMs 120 run on top of the hypervisor 116 that enables sharing of the hardware resources of source host 106S by VMs 120. One example of a hypervisor 116 that may be used is a VMware ESXi™ hypervisor provided as part of the VMware vSphere® solution made commercially available from VMware, Inc. of Palo Alto, Calif. Hypervisor 116 may run on top of the operating system of source host 106S or directly on hardware components of source host 106S.

Host 106S may communicate with one or more external storage units (shown as a storage unit) 104S via HBA 115 and/or NIC 112. Storage unit 104S may include any physical or logical data store, such as a logical unit number (LUN) or other logical data store exported from a physical storage system, a storage area network (SAN), a network-attached storage (NAS), a disk array, another type of network data storage system, or some combination of these. VM disk images (e.g., a disk image of VM 120) that are stored in storage unit 106S are transmitted to destination storage unit(s) during the transfer of such VMs. In one embodiment, control module 134 collects a disk input/output (I/O) read rate from hypervisor 116 running in host computer system 106S as part of the performance information used to predict success of a VM transfer. As used herein, disk input/output (I/O) read rate refers to the rate at which data (of a VM disk image) is being read from a storage unit 104S during a VM transfer.

To facilitate cross-site VM transfer, source data center 102S includes one or more source mobility agents, an example of which is mobility agent 122S. Destination data center 102D may also include one or more destination mobility agents (not shown). Such mobility agents may run inside VMs or directly on hardware computer systems. In one embodiment, source mobility agent 122S includes a host simulator that permits the mobility agent 122S to act as if it were the destination host of a VM transfer, and a destination mobility agent may include a host simulator that permits the destination mobility agent to act as a host that is the source of the VM transfer to the ultimate destination host in destination data center 102D. That is, during a VM transfer, mobility agent 122S in source data center 102S acts as a destination host to receive VM data (e.g., virtual disk and memory contents) from source host 106S, and then transmits the received data over a pair of gateways 126S and 126D to a mobility agent in destination data center 102D, which in turn acts as a source host to send the data to a destination host in destination data center 102D. A detailed description of VM transfer via mobility agents is provided in U.S. patent application Ser. No. 15/690,241, filed Aug. 29, 2017 and entitled "Live Migration of Virtual Computing Instances Between Data Centers," which is incorporated herein by reference in its entirety. Mobility agents 122S, 122D may also serve as data flow control modules. When data, such as a VM's disk and memory contents, is transferred from a source host 106S to a source mobility agent 122S, ultimately bound for destination data center 102D, source mobility agent 122S can slow down the rate of data transfer by "throttling" the rate at which it receives or retrieves data from source host 106S. For a detailed description of throttling, see U.S. patent application Ser. No. 15/701,387, filed Sep. 11, 2017 and entitled "Dynamic Flow Control for Transferring Data Efficiently and Effectively Over Non-Linear Buffered Network Paths," which is incorporated herein by reference in its entirety. In one embodiment, control module 134 collects data insertion rates from mobility agent 122 as part of the performance information used to predict success of a VM transfer. As used herein, data insertion rate refers to the rate of data flow between source host 106S and source mobility agent 122S, i.e., the rate at which the VM data is transferred to source mobility agent 122S.

WAN optimizer 124 is configured to increase data transfer efficiencies by, among other things, compressing data being transmitted over a WAN. For example, WAN optimizer 124 may be the WAN optimizer described in U.S. patent application Ser. No. 14/838,537, filed Aug. 28, 2015 and entitled "Data Center WAN Aggregation to Optimize Hybrid Cloud Connectivity," or in U.S. patent application Ser. No. 14/838,572, filed Aug. 28, 2015 and entitled "Pre-Fetch Cache Population for WAN Optimization," which are incorporated herein by reference in their entireties. In one embodiment, control module 134 collects compression ratio and throughput information from WAN optimizer 124 as part of the performance information used to predict success of a VM transfer. As used herein, compression ratio refers to the reduction in data representation size expressed as a ratio (e.g., 10:1), and compression throughput refers to a rate of data compression.

Source gateway 126S (e.g., executing as a virtual appliance) is configured to provide source data center 102S with connectivity to the outside world, and in particular to an external data center, shown as destination data center 102D. Source gateway 126S connects to destination data center 102D through a site interconnect comprising one or more connections, e.g., one or more of a WAN (e.g., Internet), a dedicated direct link, Multiprotocol Label Switching (MPLS), or a "stretched" layer-2 (L2) network, a local area network (LAN), etc. Source gateway 126S may further manage external public internet protocol (IP) addresses for VMs on source host 106S and route traffic incoming to and outgoing from source data center 102S. Source gateway 126S may also provide networking services, such as a firewall, network address translation (NAT), dynamic host configuration protocol (DHCP), and load balancing, as well as virtual private network (VPN) connectivity with other VPN endpoints, such as a destination gateway within destination data center 102D. In one embodiment, control module 134 collects network latency, network throughput, and packet loss information from source gateway 126S as part of the performance information used to predict success of a VM transfer. As used herein, network latency refers to the time taken to send a packet over a network from a source (e.g., source gateway 126S) to a destination (e.g., a destination gateway), network throughput refers to the amount of data transmitted over a network in a given time period (e.g., in megabits or gigabits per second), and packet loss refers to a percentage of packets sent that are lost.

Figure 3:
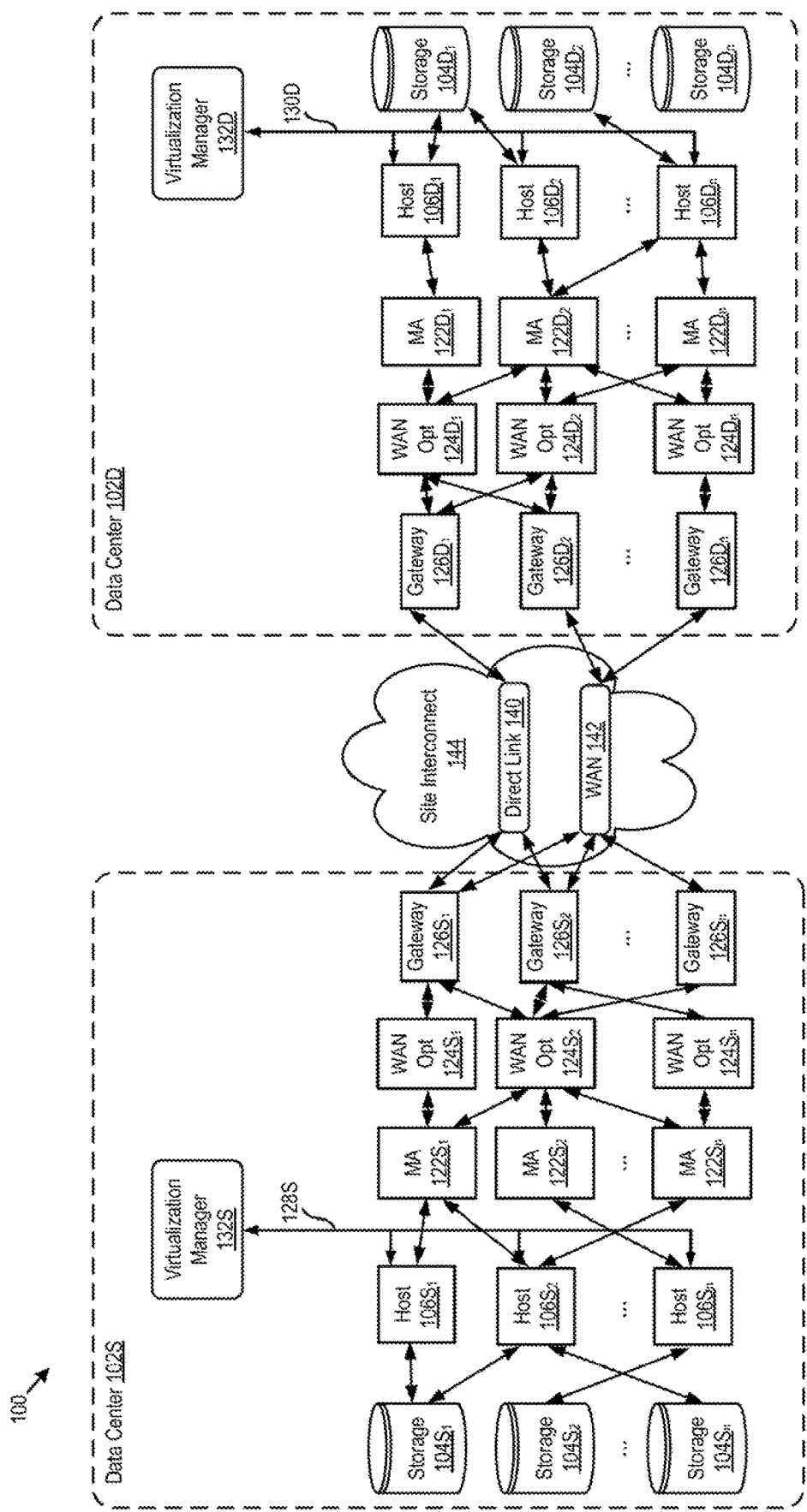
FIG. 3 illustrates a cross-site computing system in which one or more embodiments may be utilized.

FIG. 3 illustrates in greater detail cross-site computing system 100 in which one or more embodiments may be utilized. As shown, source data center 102S includes a number of host computer systems $106S_{1-n}$, storage units $104S_{1-n}$, mobility agents $122S_{1-n}$, and gateways $126S_{1-n}$. Destination data center 102D also includes hosts $106D_{1-n}$, storage units $104D_{1-n}$, mobility agents $122D_{1-n}$, and gateways $126D_{1-n}$. The source and destination hosts $106S_{1-n}$ and $106D_{1-n}$, storages $104S_{1-n}$ and $104D_{1-n}$, mobility agents $122S_{1-n}$, and $122D_{1-n}$, and gateways $126S_{1-n}$ and $126D_{1-n}$, may perform similar functionalities as the host 106S, storage unit 104S, mobility agent 122S, and gateway 126S, respectively, described above with respect to FIG. 1. In addition, mobility agents $122S_{1-n}$, in source data center 102S may each include a VM transfer flow control module, described above, and mobility agents $122D_{1-n}$, in destination data center 102D may each include a similar VM transfer flow control module.

Source data center 102S further includes a management component, depicted in FIG. 3 as source virtualization manager 132S, that may communicate with one or more of hosts $106S_{1-n}$ via a network 128S. Source virtualization manager 132S may execute in a central server in source data center 102S, or alternatively, source virtualization manager 132S may run in a VM in, e.g., one of hosts $106S_{1-n}$. Source virtualization manager 132S is configured to carry out administrative tasks for source data center 102S, including managing source hosts 106S, managing VMs 120 running within each source host 106S, provisioning VMs, transferring VMs from one host to another host, transferring VMs from source data center 102S to destination data center 102D, and load balancing between hosts 106S and between source data center 102S and destination data center 102D. Source virtualization manager 132S may further be configured to manage and integrate virtualized computing resources provided by destination data center 102D with virtualized computing resources of source data center 102S to form a unified computing platform. For example, source virtualization manager 132S may be configured to transfer VMs from source data center 102S to destination data center 102D, deploy VMs in destination data center 102D, and/or perform other "cross-site" administrative tasks. Although discussed herein primarily with respect to such virtualization managers 132S and 132D that integrate source and destination data center resources, it should be understood that the functionalities of the virtualization managers that are described herein may also be performed by other types of software or even hardware.

In addition to using machine learning model(s) to predict whether a VM transfer will succeed based on performance information collected during the VM transfer, and taking remediation action(s) if the VM transfer is predicted to fail, some embodiments may use machine learning model(s) to select a data transfer path over which to transfer a VM. A data transfer path may include a sequence of components in cross-site computing system 100. For example, one possible path shown in FIG. 3 is "$104S_1$, $106S_1$, $122S_1$, $126S_1$, 140,

126D$_1$, 122D$_2$, 106D$_1$, 104D$_1$." A set of paths may exist between a source storage-host pair and a destination storage-host pair. For example, the source storage-host pair and destination storage-host pair 104S$_1$-106S$_1$:104D$_1$-106D$_1$ defines a set of VM transfer paths including the "104S$_1$, 106S$_1$, 122S$_1$, 126S$_1$, 140, 126D$_1$, 122D$_1$, 106D$_1$, 104D$_1$" path and other paths that begin with source storage and host 104S$_1$-106S$_1$ and end with destination storage and host 104D$_1$-106D$_1$. Paths may alternatively be defined in terms of, e.g., two hosts or two storages, rather than a source storage-host and destination storage-host pair. In one embodiment, source control module 134S continuously collects performance information, such as the same metrics described above, during VM transfers over a number of different paths, and source control module 134 uses the collected information to make predictions of the success rate (or simply of success or failure) if a VM were to be transferred over those paths. Source control module 134S may collect performance information during actual VM transfers and/or the transfers of dummy VMs. For example, dummy VMs that are small in size (e.g., 1 GB each) may be periodically transferred over different paths, with performance information being collected during such transfers and predictions made using such performance information. Source control module 134 then uses machine learning model(s) to predict, based on the collected performance information, the success rate if a VM were transferred over the different paths, and source control module further selects a path that is associated with a highest success rate, as discussed in greater detail below.

Figure 4:
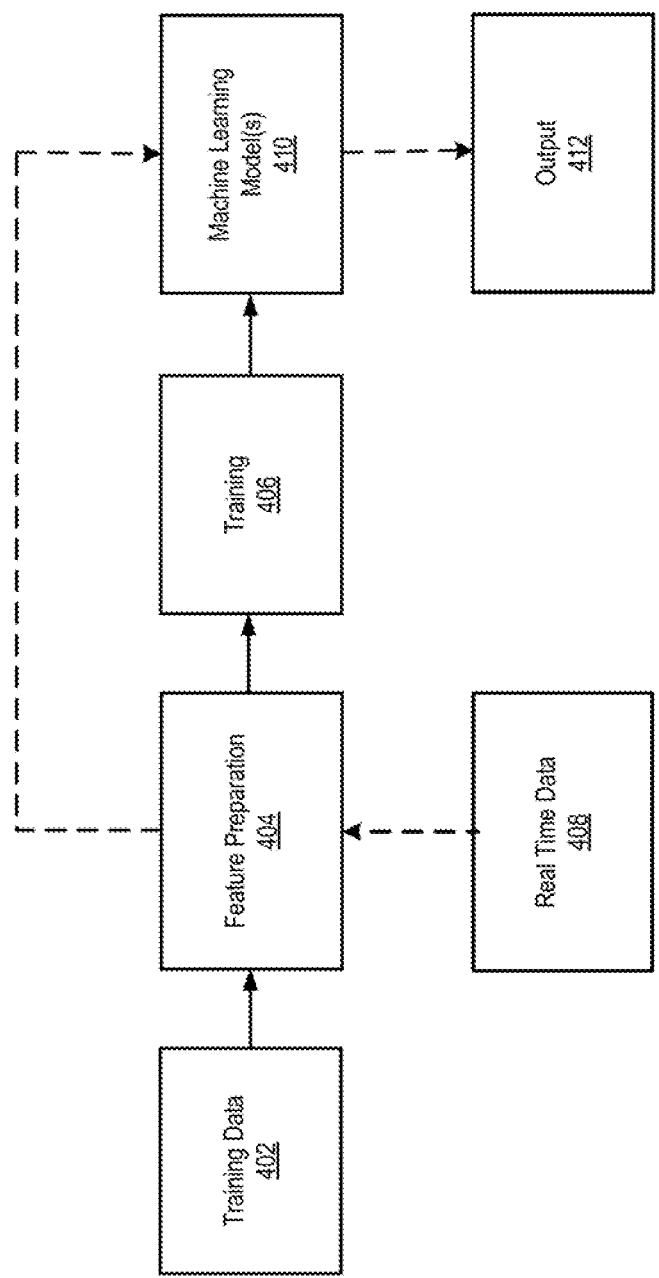
FIG. 4 illustrates an approach for training and utilizing machine learning model(s) to predict success of a virtual machine transfer, according to an embodiment.

FIG. 4 illustrates an approach for training and utilizing machine learning model(s) to predict success of a virtual machine transfer, according to an embodiment. As shown, a training phase includes processing received training data 402 during feature preparation at 404, training one or more machine learning models using a subset of the training data at 406, and evaluating the trained machine learning model(s) using another subset of the training data during the training. The training data may include performance information from representative VM transfers and associated labels indicating, e.g., whether each of the representative VM transfers was successful or not. In one embodiment, the training data includes disk input/output (I/O) read rate, data insertion rate, compression ratio and throughput, network latency and throughput, and packet loss information from a number of representative VM transfers under different conditions, as well as a success or failure label for each of the representative VM transfers. For example, the representative VM transfers may be from different testbeds, such as a high network throughput, high network latency testbed; a low network latency, low network throughput testbed; testbeds in which different types of storage are used, and the like. More generally, the training data may provide empirical information associating different combinations of computing environments, network conditions, storage devices, VM type/size and parallelism (multiple VMs being transferred at the same time), etc. information collected during the representative VM transfers with labels of whether the transfers were successful or not.

Feature preparation at 404 includes preparing the initial training data for machine learning. In one embodiment, each of the VM transfer performance metrics described above, namely disk input/output (I/O) read rate, data insertion rate, compression ratio, compression throughput, network latency, network throughput, packet loss, etc. is considered a feature. The problem then becomes: given a pattern p represented by a set of d features, each of which is a performance metric collected at a point in time during a VM transfer, i.e., $p \rightarrow x = \{x_1, x_2, \ldots, x_d\}$, should remediation action(s) be taken to prevent failure of the VM transfer? In order to solve this problem, the features from representative VM transfers may be prepared and used to train one or more machine learning models to predict the success or failure of VM transfers. Predictions made by such machine learning model(s) may then be used to determine an action to take, such as slowing down the data transfer rate of a VM transfer to prevent a predicted failure of the transfer.

In one embodiment, feature preparation may include normalizing feature data to fit into the machine learning model(s) and imputing missing data, if any, using an imputation technique. Any suitable imputation technique may be used, including those known to persons skilled in the art. Subsequent to feature preparing, one or more machine learning models are trained at 406, using a subset of the training data. In one embodiment, a majority of the training data (after feature preparation) may be used to train the machine learning model(s), and a minority of the training data used to evaluate the trained model(s). During training and thereafter, the machine learning model(s) may each take as input a feature vector $x = \{x_1, x_2, \ldots, x_d\}$ that includes prepared features (e.g., with normalized feature data and imputed data for features that are missing data) from a point in time during a VM transfer, and output a label indicating predicted success or failure of a corresponding VM transfer. In some embodiments, one or more regression and/or probabilistic models may be trained at 406. The regression models may include, e.g., support vector machine(s) (SVMs), logistic classification network(s), and/or neural network(s). The probabilistic models may include, e.g., naive Bayesian network(s). Any suitable training algorithm or algorithms may be employed to train such models, and the particular algorithm(s) used may depend on the types of models being trained.

Evaluation of trained machine learning model(s) may include validating that the trained model(s) perform well (e.g., with a success rate above a predefined threshold), and determining which model(s) perform better under different circumstances. As described, the trained model(s) may be used during VM transfers to predict, based on collected performance information, whether the transfers will succeed or fail, and remediation action(s) taken when the VM transfers are predicted to fail. In one embodiment, evaluation of the trained model(s) includes using the trained model(s) in a number of test VM transfers to predict success/failure and taking remediation action(s) when failure is predicted, as well as determining a success rate of those VM transfers when each of the trained model(s) is used. In such a case, the success rate may be defined as Success Rate=Number of Successful Transfers/Total Number of Transfers. In other embodiments, the success rate may also take into account observations made at the destination data center, such as data delivery rate variation, advertised window size variation, and so on. Through such evaluations, it can be determined how well the trained model(s) perform and which of the trained model(s) perform better under different circumstances. The evaluation results may then be stored and used to select one or more of the trained model(s) to use in making predictions during a later VM transfer, as discussed in greater detail below. Although described herein primarily with respect to evaluating trained model(s) to determine success rates, the evaluation of trained model(s) may also include determining the accuracy of labels output by the trained model(s), compared to the manually-specified labels in a minority of the training data used for validation.

After machine learning model(s) are trained and evaluated, such model(s) (shown as machine learning model(s) 410) may then be used during an inference phase to predict the success or failure of a VM transfer based on real-time performance information collected during the VM transfer. Illustratively, the real-time performance information is received at 408 and includes performance metrics collected at a point in time. Additional performance information may be collected at other points in time during the VM transfer. In one embodiment, the collected performance information may include performance metrics such as a disk input/output (I/O) read rate, data insertion rate, compression ratio and throughput, network latency and throughput, and/or packet loss, as described above. The collected performance information may also include a data delivery rate collected from a hypervisor running in a destination host computer and sent back to control 134 in one embodiment. Each such performance metric may be considered a feature, and source control module 134 performs feature preparation on the performance metrics at 404. Similar to feature preparation during training, the feature preparation of real-time performance metrics may include, e.g., normalization of feature data as well as imputation of missing data. After feature preparation, a feature vector including the (prepared) real-time performance information is input into trained machine learning model(s) at 408, and each of those machine learning model(s) outputs a label indicating a prediction of success or failure at 412. In one embodiment, mobility agent 122S may take remediation action(s), such as notifying a source VM transfer engine in a hypervisor running in source host computer 106S to slow down the data transfer rate of a VM transfer, when failure of the VM transfer is predicted. In another embodiment, source control module 134S may use predictions made during previous VM transfers (and/or dummy VM transfers) to select a path over which another VM can be transferred, with the selected path being associated with, e.g., a highest probability of a successful VM transfer or a prediction of a successful transfer.

Figure 5:
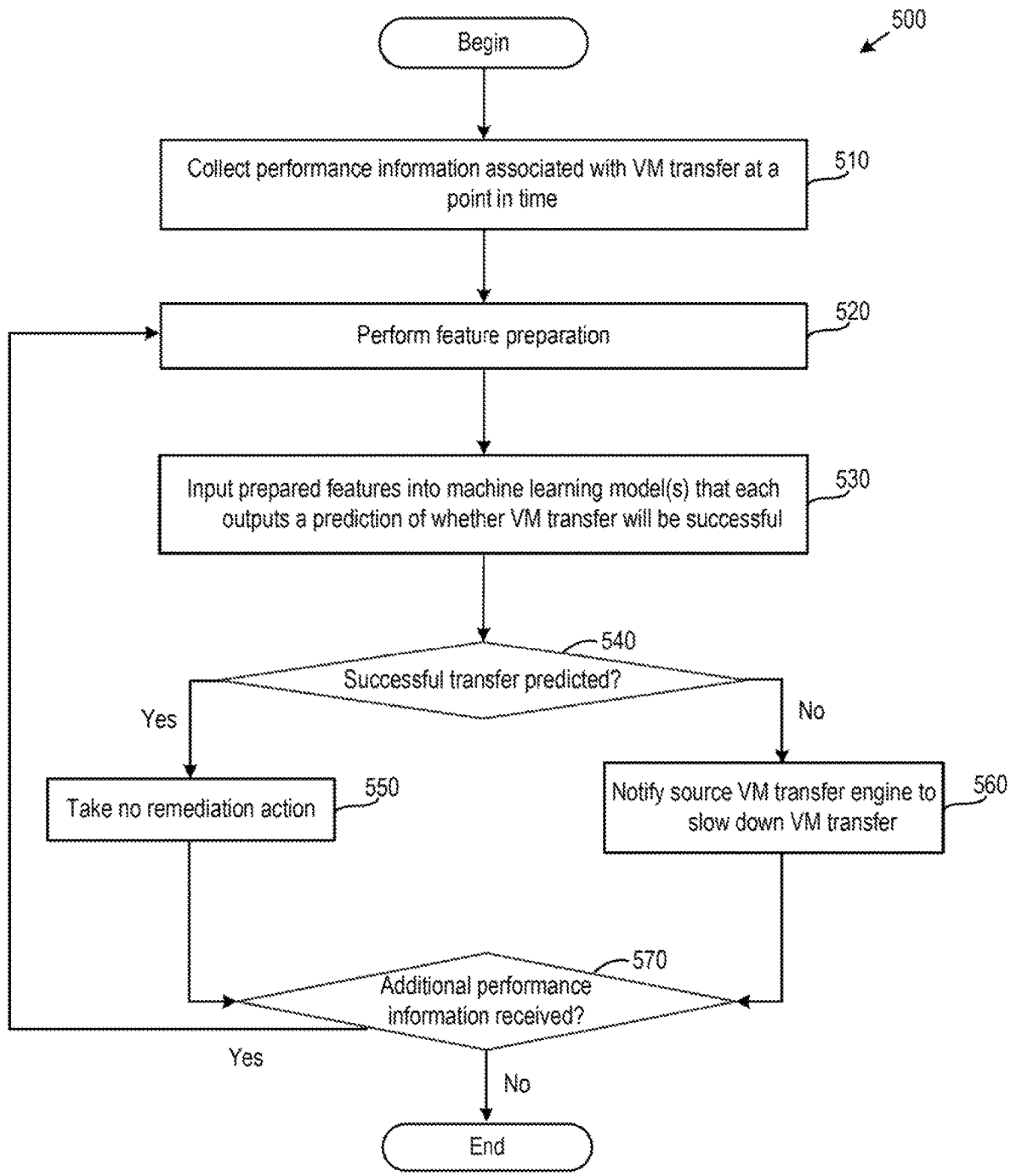
FIG. 5 illustrates a method of predicting virtual machine transfer success and taking remediation action(s), according to an embodiment.

FIG. 5 illustrates a method 500 of predicting virtual machine transfer success and taking remediation action(s), according to an embodiment. As shown, method 500 begins at step 510, where source control module 134 collects performance information associated with a VM transfer at a point in time. This step assumes that a data transfer path for the VM transfer has already been selected, and performance information is collected during transfer of the VM over the selected path. As described, the performance information that is collected may include performance metrics such as a disk I/O read rate collected from a hypervisor running in host computer system 106S; a data insertion rate collected from mobility agent 122; compression ratio and throughput collected from WAN optimizer 124; and/or network latency, network throughput, and packet loss collected from source gateway 126S. In addition, a data delivery rate may be collected from a hypervisor running in a destination host 106D and sent back to control module 134 in one embodiment.

At step 520, source control module 134 performs feature preparation. In one embodiment, each of the disk I/O read rate, data insertion rate, compression ratio, compression throughput, network latency, network throughput, packet loss, and/or data delivery rate metrics described above may be considered a feature. In such a case, feature preparation may include normalizing the collected feature data and/or imputing missing data, if any.

At step 530, source control module 134 inputs the prepared features into machine learning model(s) that each outputs a prediction of whether the VM transfer will be successful (or a probability of success). As described, each of the machine learning model(s) may take as input a feature vector x={$x_1$, $x_2$, ..., $x_d$} including prepared features $x_i$ from a point in time of a VM transfer, and output a label indicating a predicted success or failure (or a probability of success) of the VM transfer. Such machine learning model(s) may be trained using performance information collected during representative VM transfers and associated labels of success or failure (or a probability of success).

In some embodiments, the machine learning model(s) are also evaluated during the training phase to determine the success rate of VM transfers when those machine learning model(s) are used to make predictions, as described above. As described, the evaluation may include performing test VM transfers using the trained machine learning models under different circumstances (e.g., using different testbeds) associated with different features, and determining the success rates of those machine learning models for each of the different circumstances. The evaluation results may then be used to select one or more of the trained machine learning model(s) for predicting whether a later VM transfer will be successful, at step 530. For example, given a prepared feature vector, source control module 134 may rank the trained machine learning model(s) based on evaluated success rates, select one or more of the trained machine learning model(s) associated with the highest success rate(s), and input the prepared feature vector into the selected machine learning model(s) at step 530. As another example, an additional machine learning model may be trained to select one (or more) of the trained machine learning model(s) based on feature vectors and, in such a case, source control module 134 may input the prepared feature vector into the additional machine learning model and use, at step 530, the trained machine learning model(s) selected by the additional machine learning model.

At step 540, if the machine learning model(s) predict at step 530 that the VM transfer will be successful, then source control module 134 takes no remediation action at step 550, allowing the VM transfer to continue as before. When more than one machine learning model is used to make predictions at step 530, such predictions may be ranked or combined (e.g., in a weighted average) in any suitable manner to determine a final prediction of whether the VM will be successful, and source control module 134 may then use the final prediction to determine whether remediation actions are needed at step 540. When the machine learning model(s) output probabilities of success, those probabilities may also be used in any suitable manner, such as determining that the VM transfer will be successful and that no remediation action is required if the probability exceeds a predefined threshold.

On the other hand, if the machine learning model(s) predict at step 530 that the VM will not be successful, then at step 560, mobility agent 122S takes remediation action(s), which may including notifying a source VM transfer engine in a hypervisor running in the source host (e.g., host 104S) to slow down a data transfer rate of the VM transfer. As described, a VM transfer may fail if the source side is sending packets too quickly and packets are dropped on the destination side. Slowing down the VM transfer may help prevent packets from being dropped and data in those packets lost. Other remediation actions, which do not necessarily involve the source VM transfer engine, may include changing the WAN optimizer policies (discrete value) or buffer size (continuous value) to mitigate VM transfer performance issues in other aspects. In such cases, machine learning models may also be trained to predict, e.g., relatively optimal WAN optimizer policies and buffer sizes that are then used.

At step 570, if source control module 134 receives additional performance information, at another point in time during the VM transfer, then method 500 returns to step 520, where source control module 134 performs feature preparation using the additional performance information.

Figure 6:
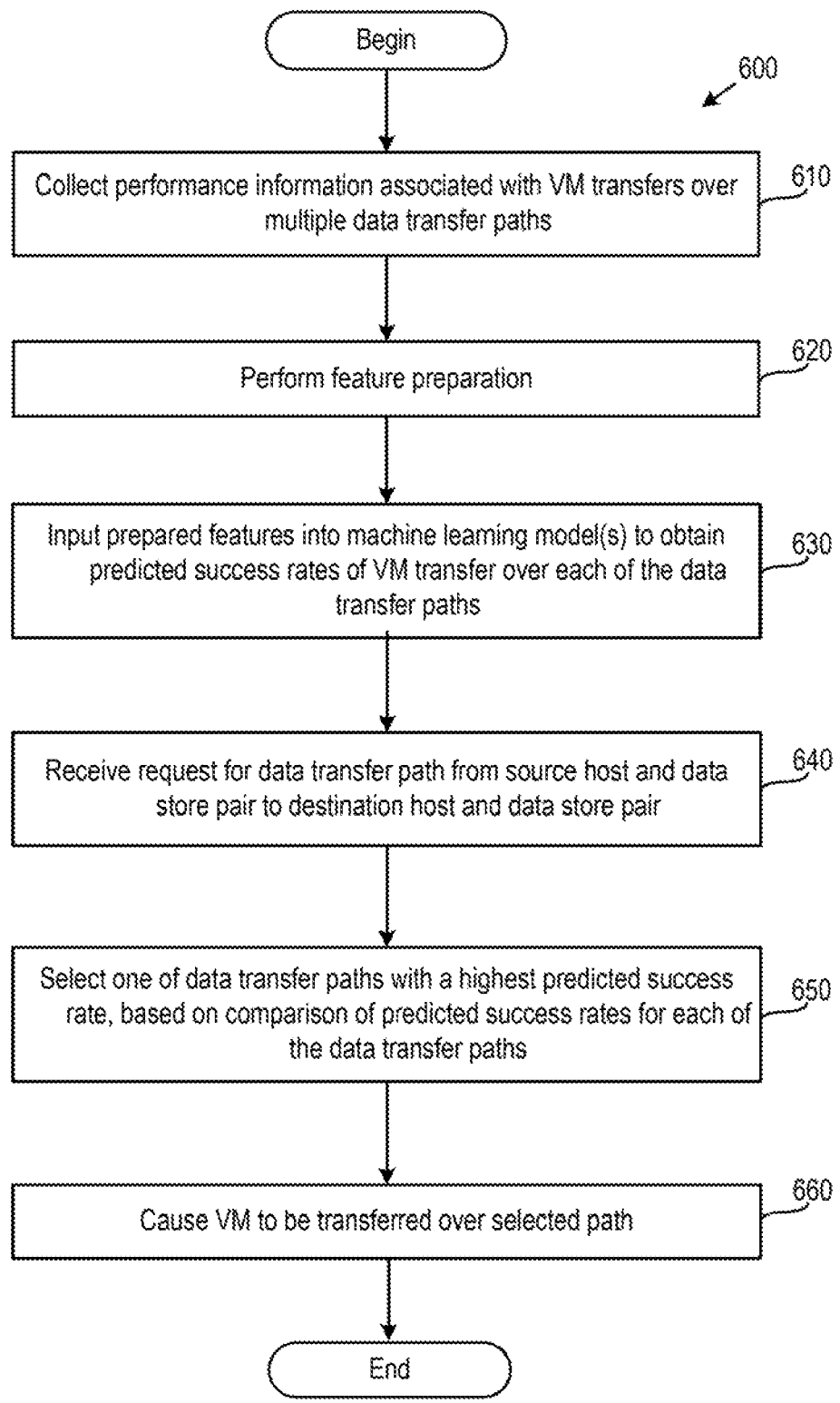
FIG. 6 illustrates a method of selecting a data transfer path to transfer a virtual machine over, according to an embodiment.

FIG. 6 illustrates a method of selecting a data transfer path to transfer a virtual machine over, according to an embodiment. As shown, method 600 begins at step 610, where source control module 134 collects performance information associated with VM transfers over multiple data transfer paths. As described, source control module 134S may continuously collect performance information during actual VM transfers over the multiple data paths and/or transfers of dummy VMs that are made, e.g., periodically. Similar to the performance information collected at step 510 of method 500, the performance information collected by source control module 134S may include performance metrics such as disk I/O read rates collected from hypervisors running in host computer systems $106S_{1-n}$; data insertion rates collected from mobility agents $122_{1-n}$; compression ratio and throughput collected from WAN optimizers $124_{1-n}$; and/or network latency, network throughput, and packet loss collected from source gateway $126S_{1-n}$. In addition, the collected performance information may include data delivery rates collected from hypervisors running in destination hosts $106D_{1-n}$.

At step 620, source control module 134 performs feature preparation using the collected performance information. Similar to the discussion above of feature preparation at step 520, feature preparation at step 620 may include normalizing feature data and/or imputing missing data, if any. Further, each of the performance metrics described above may be considered a feature for purposes of feature preparation.

At step 630, source control module 134 inputs the prepared features (e.g., as feature vectors) into machine learning model(s) to obtain predicted success rates of a VM transfer over each of the data transfer paths. In one embodiment, machine learning model(s) may be trained using performance information collected during representative VM transfers (from different testbeds) and associated labels of success rates, and such machine learning model(s) may then be used to predict success rates over multiple data transfer paths. Similar to the discussion above with respect to step 530, the machine learning model(s) used to predict success rates may also be selected based on prepared features. Although described herein primarily with respect to success rates, in another embodiment machine learning model(s) may be employed to output labels indicating predicted success or failure of the VM transfers over each of the paths over multiple data transfer paths, and a VM may then be transferred over one of the paths that is associated with a successful prediction.

At step 640, source control module 134 receives a request for a data transfer path from a source host and data store pair to a destination host and data store pair. Then, at step 650, source control module 134 selects one of the data transfer paths with a highest predicted success rate, based on a comparison of the success rates predicted at step 630 for each of the data transfer paths.

At step 660, the VM is transferred over the selected path. In one embodiment, the selected path may be provided to virtualization manager 132S, which may then execute a transfer workflow from the source host, source data store pair (e.g., source host $104S_1$ and source data store $106S_1$) to a source mobility agent (e.g., source mobility agent $122_1$), and on the destination side, destination virtualization manager 132D executes a migration workflow between destination mobility agent (e.g., mobility agent $122D_1$) and destination host (e.g., destination host $104D_1$). A transfer interconnect may or may not be chosen as part of the selected path. For example, if no transfer interconnect is chosen, then the source gateway may itself determine an interconnect to use after being provided the destination gateway of the selected path.

Although discussed herein primarily with respect to the training of machine learning models during a training phase, prior to the use of the trained models to make predictions during later VM transfers, source control module 134 may also gather data (e.g., feature and success/failure data) during the later VM transfers in some embodiments. Such gathered data may then be fed back as training data to re-train and improve the previously trained machine learning model(s).

Although discussed herein primarily with respect to feature data collected at a point in time and input into trained machine learning model(s), in alternative embodiments the feature data that is input into the machine learning model(s) as a feature vector may be from more than one point in time. For example, histogram data may be used that indicates performance metrics measurements over a period of time.

Advantageously, techniques disclosed herein use trained machine learning model(s) to make predictions of whether VM transfers will succeed or fail, and remediation action(s) may then be taken when a VM transfer is predicted to fail. The machine learning model(s) may make predictions based on feature data at a point in time, rather than data trends over a period of time, which can be beneficial given that the compression ratio used during a VM transfer may be dynamic and not predictable based on recent trends. Further, after machine learning model(s) are trained, those machine learning model(s) may be used to make immediate predictions based on real-time data. In addition, techniques disclosed herein collect performance information primarily from components in a local site, as opposed to components in a remote site, from which it may be more difficult to collect performance information.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:
1. A computer-implemented method, comprising:
    receiving first performance information associated with a first data transfer path and a plurality of other data transfer paths;
    predicting, using a first machine learning model and the first performance information, a respective success rate of transferring a virtual computing instance from a first data center to a second data center over each of the first data transfer path and the other data transfer paths;
    transferring the virtual computing instance from the first data center to the second data center over the first data transfer path responsive to determining that the respective success rate of transferring the virtual computing instance over the first data transfer path is higher than the success rate of transferring the virtual computing instance over the other data transfer paths;
    receiving second performance information associated with the transfer of the virtual computing instance from the first data center to the second data center over the first data transfer path;
    predicting, using a second machine learning model and the received second performance information, whether the transfer of the virtual computing instance over the first data transfer path will succeed; and
    responsive to predicting that the transfer of the virtual computing instance will not succeed, reducing a rate at which the virtual computing instance is transferred.
2. The computer-implemented method of claim 1, further comprising, selecting the first second machine learning model from a plurality of trained machine learning models based, at least in part, on the received second performance information.

3. The computer-implemented method of claim 1, wherein the second machine learning model is trained using training data that includes performance and success information associated with at least one of a high throughput, high latency transfer of a virtual computing instance from a third data center to a fourth data center or a low latency, low throughput transfer of a virtual computing instance from the third data center to the fourth data center.

4. The computer-implemented method of claim 1, further comprising, re-training the second machine learning model using at least the received second performance information.

5. The computer-implemented method of claim 1, wherein the received second performance information includes at least one of a disk input/output read rate, a network latency, a network throughput, a network packet loss, a compression ratio, a compression throughput, a data insertion rate, or a data delivery rate.

6. The computer-implemented method of claim 1, wherein the second machine learning model is one of a support vector machine, a logistic regression model, a neural network, or a naive Bayesian network.

7. The computer-implemented method of claim 1, wherein the second machine learning model outputs one of a label indicating whether the transfer of the virtual computing instance will succeed or fail or a predicted probability that the transfer of the virtual computing instance will succeed.

8. The computer-implemented method of claim 1, further comprising, responsive to predicting that the transfer of the virtual computing instance will succeed, maintaining the rate at which the virtual computing instance is transferred.

9. The computer-implemented method of claim 1, wherein the virtual computing instance is a virtual machine.

10. The method of claim 1, wherein the first data transfer path comprises a first gateway in the first data center and a second gateway in the second data center, and wherein the second performance information comprises data received from the first gateway.

11. A non-transitory computer-readable storage medium comprising instructions, which when executed by a computing system, causes the computing system to carry out operations comprising:
receiving first performance information associated with a first data transfer path and a plurality of other data transfer paths;
predicting, using a first machine learning model and the first performance information, a respective success rate of transferring a virtual computing instance from a first data center to a second data center over each of the first data transfer path and the other data transfer paths;
transferring the virtual computing instance from the first data center to the second data center over the first data transfer path responsive to determining that the respective success rate of transferring the virtual computing instance over the first data transfer path is higher than the success rate of transferring the virtual computing instance over the other data transfer paths;
receiving second performance information associated with the transfer of the virtual computing instance from the first data center to the second data center over the first data transfer path;
predicting, using a second machine learning model and the received second performance information, whether the transfer of the virtual computing instance over the first data transfer path will succeed; and
responsive to predicting that the transfer of the virtual computing instance will not succeed, reducing a rate at which the virtual computing instance is transferred.

12. The computer-readable storage medium of claim 11, the operations further comprising, selecting the second machine learning model from a plurality of trained machine learning models based, at least in part, on the received second performance information.

13. The computer-readable storage medium of claim 11, wherein the second machine learning model is trained using training data that includes performance and success information associated with at least one of a high throughput, high latency transfer of a virtual computing instance from a third data center to a fourth data center or a low latency, low throughput transfer of a virtual computing instance from the third data center to the fourth data center.

14. The computer-readable storage medium of claim 11, the operations further comprising, re-training the second machine learning model using at least the received second performance information.

15. The computer-readable storage medium of claim 11, wherein the received second performance information includes at least one of a disk input/output read rate, a network latency, a network throughput, a network packet loss, a compression ratio, a compression throughput, a data insertion rate, or a data delivery rate.

16. The computer-readable storage medium of claim 11, wherein the second machine learning model is one of a support vector machine, a logistic regression model, a neural network, or a naive Bayesian network.

17. The computer-readable storage medium of claim 11, wherein the second machine learning model outputs one of a label indicating whether the transfer of the virtual computing instance will succeed or fail or a predicted probability that the transfer of the virtual computing instance will succeed.

18. The computer-readable storage medium of claim 11, the operations further comprising, responsive to predicting that the transfer of the virtual computing instance will succeed, maintaining the rate at which the virtual computing instance is transferred.

19. A system, comprising:
a memory; and
a processor storing one or more applications, which, when executed on the processor, perform operations comprising:
receiving first performance information associated with a first data transfer path and a plurality of other data transfer paths;
predicting, using a first machine learning model and the first performance information, a respective success rate of transferring a virtual computing instance from a first data center to a second data center over each of the first data transfer path and the other data transfer paths;
transferring the virtual computing instance from the first data center to the second data center over the first data transfer path responsive to determining that the respective success rate of transferring the virtual computing instance over the first data transfer path is higher than the success rate of transferring the virtual computing instance over the other data transfer paths;
receiving second performance information associated with the transfer of the virtual computing instance from the first data center to the second data center over the first data transfer path;

predicting, using a second machine learning model and the received second performance information, whether the transfer of the virtual computing instance over the first data transfer path will succeed; and responsive to predicting that the transfer of the virtual computing instance will not succeed, reducing a rate at which the virtual computing instance is transferred.

* * * * *